June 17, 1930. H. J. WOODALL ET AL 1,764,668
AUTOMOBILE CLOSED BODY CONSTRUCTION
Filed Aug. 2, 1926

INVENTORS
HERBERT J. WOODALL
MEREDITH S. RANDALL
BY
Parker & Burton
ATTORNEY.

Patented June 17, 1930

1,764,668

UNITED STATES PATENT OFFICE

HERBERT J. WOODALL AND MEREDITH S. RANDALL, OF DETROIT, MICHIGAN

AUTOMOBILE CLOSED-BODY CONSTRUCTION

Application filed August 2, 1926. Serial No. 126,587.

Our invention relates to an improved panel wall structure and for purposes of illustration is shown as embodied in the interior wall structure of an automobile door.

An object is to provide a simple, inexpensive wall construction of the character hereinafter more fully set forth employing a covered cardboard panel so formed as to be easily and quickly secured in place upon a supporting frame and so constructed that the edges of the covering material are concealed and protected, the panel securely held in place, and the means whereby it is secured in place are concealed and protected.

Our improved panel structure, as an independent article of commerce, is described in different modifications in detail in a copending application this date filed, which application relates to the panel structure per se and the method of its construction. The instant application is concerned with an improved method of fastening a panel of this type in place. Many meritorious features and advantages of the improved structure here shown will appear more fully from the following specification, appended claims, and accompanying drawing, in which:

Figure 1:
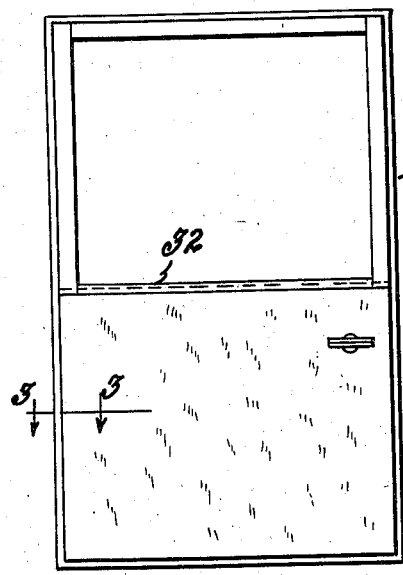
Fig. 1 is a side elevation of the interior wall of an automobile door of a conventional design.
Figure 3:
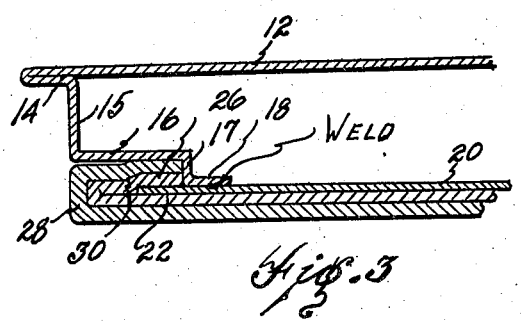
Fig. 3 is a horizontal cross-sectional view taken on line 3—3 of Fig. 1.
Figure 4:
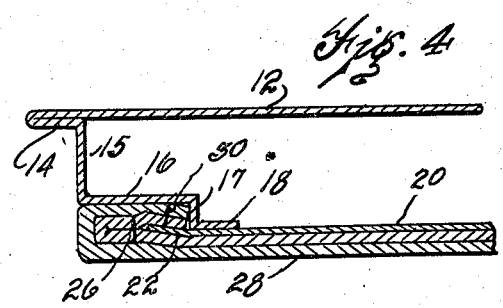
Fig. 4 is a horizontal cross-sectional view taken on the same line as Fig. 3, showing the flange 22 bent to hold the panel in place.
Figure 2:
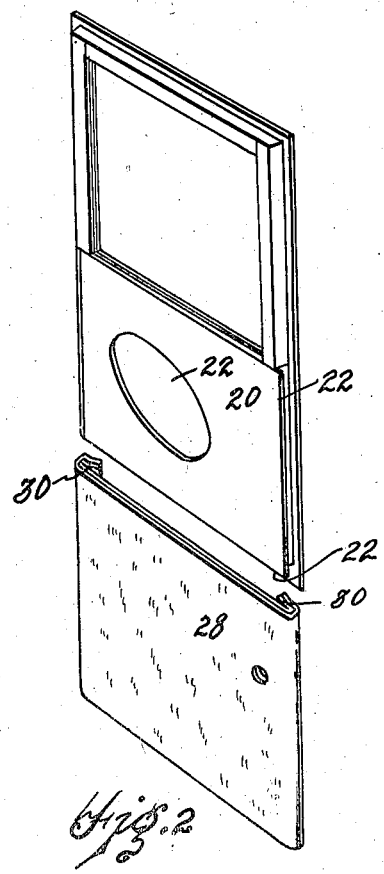
Fig. 2 is a perspective of such door with the panel removed and showing the panel in perspective.

Let 10 indicate an automobile door assembly. It is common practice to make such doors of sheet metal having an outer wall 12 turned inwardly as at 14, 15, 16, 17, and 18. A sheet metal plate 20, cut out at 21 to provide an opening for the insertion of a window regulator, is fastened to the portion 18 by spot welding or in any other suitable manner. This plate 20 is provided in such size that it has three marginal portions 22 which project beyond the portion 17 as shown in Figs. 2, 3, and 4. It will be seen that this projecting marginal portion 22 extends beyond the part 17 at the bottom of the panel and on each of the two sides adjacent thereto and forms a ledge or linear extension which is adapted to receive and support our improved wall panel.

Figure 5:
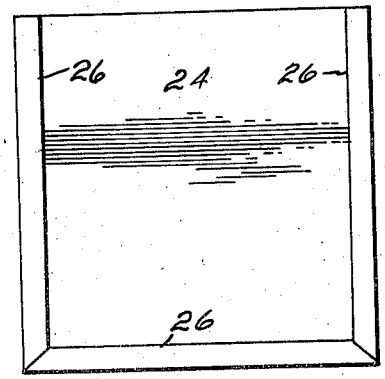
Fig. 5 is a side elevation of the panel removed from the door.

This improved wall panel is preferably formed of suitable material such as cardboard 24. This cardboard panel is creased along a line spaced from its margin and the marginal portions beyond the crease, indicated as 26, are folded over as shown in Fig. 5.

The panel is covered on one side with suitable covering material 28. This covering material is secured by being glued or otherwise fastened to the folded over marginal portion 26 of the panel. In Figs. 3 and 4 the folded over marginal portion 26 is shown as fastened down by stitching 30. In Fig. 4 the covering material 28 is shown as secured to the folded over marginal portion 26 by stitching 30. In either instance the folded over marginal portion 26 forms a self-supporting and substantially rigid flange, preferably along three edges of the panel upon its uncovered side.

This panel is capable of being readily placed in position. This may be accomplished in the manner illustrated in Fig. 2. The panel is slid over the ledges 22 of the plate 20. It is so formed that it may be moved slightly laterally or vertically when mounted upon said ledge to bring it into the proper position. The upper edge of the panel is concealed by the window molding 32 which extends downwardly thereover.

The extensions 22 of the plate 20 may be formed of readily malleable material which permits them to be bent into the shape shown in Fig. 4. They may be crimped into this shape after the panel has been inserted thereover and when so bent they will firmly hold the panel against any possibility of displacement.

What we claim is:

1. In body construction, a frame having a pair of spaced apart substantially parallel panel supporting members formed of readily malleable metal, a panel upon the frame having marginal flanges engaged over said members; said members being bent toward the frame and out of their normal plane against the marginal flanges of the panel.

2. In body construction, a substantially rectangular frame having deformable marginal metal ledges on three sides spaced laterally from the frame forming a recess between the ledge and the frame, a flexible panel for the frame having inturned marginal flanges on its corresponding three sides and provided with a covering extending over the panel and over said inturned flanges, said panel supported upon the frame by having its inturned flanges engaged over the ledges of the frame, said ledges being deformed inwardly holding the flanges of the panel securely against the opposite marginal portion of the frame.

3. In body construction, a frame to support a panel provided with panel supporting marginal flanges on opposite margins, said flanges spaced laterally from the body of the frame forming a recess between the flanges and the body of the frame, a wall panel having corresponding marginal folds engaged over said flanges and received within said recesses, said flanges being of deformable material and being bent out of their normal plane toward the body of the frame gripping such folds against the body of the frame to secure the panel in place upon the frame.

4. In body construction, a panel supporting frame having a deformable metal marginal flange along one edge, said flange spaced laterally from the body of the frame forming a recess between the flange and the body of the frame, a flexible wall panel for the frame provided with a marginal fold received over said marginal flange with the inturned portion of the fold received between the flange and the body of the frame, said marginal flange being bent permanently toward the body of the frame gripping the marginal fold of the panel thereagainst to secure the panel to the frame.

5. In body construction, a panel supporting frame having a permanently deformable metal ledge extending along a margin thereof said ledge being spaced laterally from the body of the frame, a flexible cardboard wall panel having a folded over marginal portion, said panel supported upon said frame with the ledge of the frame received between the body of the panel and the folded over margin thereof, said ledge being bent out of its normal plane toward the body of the frame gripping the marginal fold of the panel thereagainst to secure the panel to the frame.

In testimony whereof, we sign this specification.

HERBERT J. WOODALL.
MEREDITH S. RANDALL.